United States Patent
Miller et al.

(10) Patent No.: US 10,447,107 B2
(45) Date of Patent: Oct. 15, 2019

(54) MOTOR DRIVE COVER FOR PROTECTION AGAINST CONTAMINANTS

(71) Applicant: Danfoss Power Electronics A/S, Grasten (DK)

(72) Inventors: George Miller, Roscoe, IL (US); Ryan Drabek, Rockton, IL (US); Lester Grzesik, Poplar Grove, IL (US); Matthew Gray, Rockford, IL (US); Frank-Erik Johansen, Soenderborg (DK); Eric Von Stoutenborough, Fort Atkinson, WI (US)

(73) Assignee: Danfoss Power Electronics A/S, Graasten (DK)

( * ) Notice: Subject to any disclaimer, the term of this patent is extended or adjusted under 35 U.S.C. 154(b) by 574 days.

(21) Appl. No.: 14/907,912

(22) PCT Filed: Jun. 12, 2014

(86) PCT No.: PCT/IB2014/062153
§ 371 (c)(1),
(2) Date: Jan. 27, 2016

(87) PCT Pub. No.: WO2015/015329
PCT Pub. Date: Feb. 5, 2015

(65) Prior Publication Data
US 2016/0172926 A1  Jun. 16, 2016

Related U.S. Application Data

(60) Provisional application No. 61/861,184, filed on Aug. 1, 2013.

(51) Int. Cl.
*H02K 5/20* (2006.01)
*H02K 5/10* (2006.01)
*H02K 9/02* (2006.01)

(52) U.S. Cl.
CPC .............. *H02K 5/20* (2013.01); *H02K 5/10* (2013.01); *H02K 9/02* (2013.01); *H02K 2205/09* (2013.01)

(58) Field of Classification Search
CPC .. H02K 5/10; H02K 5/20; H02K 9/02; H02K 9/20
(Continued)

(56) References Cited

U.S. PATENT DOCUMENTS 3,364,838 A * 1/1968 Bradley ................. A47B 81/00
165/80.3
3,739,207 A * 6/1973 Keilmann ................ H02K 5/10
310/59
(Continued)

FOREIGN PATENT DOCUMENTS

CA   2218009 A1   4/1998
CA   2478741 A1   2/2005
(Continued)

OTHER PUBLICATIONS

International Search Report for PCT Serial No. PCT/IB2014/062153 dated Feb. 18, 2015.

*Primary Examiner* — Julio C. Gonzalez
*Assistant Examiner* — Rashad H Johnson
(74) *Attorney, Agent, or Firm* — McCormick, Paulding & Huber LL

(57) ABSTRACT

A cover for a motor drive is provided. The cover includes an opening (often at the bottom of the cover) to allow air to pass to an air inlet of the motor drive and an opening (often near the top of the cover) to allow air from an air outlet of the motor drive to exit the cover. A hood provides rain protection for the drive and a separator (such as a baffle) within the enclosure prevents air flowing within the enclosure from the air outlet to the air inlet of the drive. The hood and/or the separator are shaped to direct air from the air outlet away (Continued)

from the enclosure in order to substantially reduce the re-circulation of air from the air outlet to the air inlet of the drive.

19 Claims, 3 Drawing Sheets

(58) Field of Classification Search
USPC .................. 310/58, 89, 52, 54, 64; 361/695
See application file for complete search history.

(56) References Cited

U.S. PATENT DOCUMENTS

| | | | | |
|---|---|---|---|---|
| 4,726,198 A * | 2/1988 | Ouwenga | ................. | F25B 3/00 62/499 |
| 4,759,196 A * | 7/1988 | Davis | ................... | F24F 1/0007 62/326 |
| 5,266,856 A * | 11/1993 | Holter | ...................... | H02K 5/24 181/202 |
| 5,944,595 A * | 8/1999 | Prothro | .................. | A22C 21/02 452/88 |
| 6,105,875 A * | 8/2000 | LaGrotta | ............ | H05K 7/20572 165/80.3 |
| 6,643,130 B1 * | 11/2003 | DeMarchis | ........ | H05K 7/20181 165/80.3 |
| 6,703,730 B2 | 3/2004 | Hayashi | | |
| 7,345,875 B2 * | 3/2008 | Elkins | ................ | H05K 7/20172 361/690 |
| 8,405,261 B2 * | 3/2013 | Humer | ..................... | H02K 5/10 310/52 |
| 8,800,403 B2 * | 8/2014 | Gargaro, III | .............. | B63C 3/06 74/606 R |
| 2002/0175573 A1 * | 11/2002 | Hayashi | ................... | H02K 5/10 310/54 |
| 2004/0007347 A1 * | 1/2004 | Stoller | ................... | H05K 7/206 165/47 |
| 2005/0253465 A1 * | 11/2005 | Takenaka | ................. | H02K 5/20 310/52 |
| 2006/0000629 A1 | 1/2006 | Johnson et al. | | |
| 2007/0152126 A1 * | 7/2007 | Graham | ................... | F16M 1/00 248/678 |
| 2009/0052132 A1 * | 2/2009 | Fernandez | ................ | F28D 9/00 361/696 |
| 2012/0083196 A1 * | 4/2012 | Mockridge | .......... | F24F 11/0001 454/184 |
| 2014/0011440 A1 * | 1/2014 | Savchenko | ............. | F24F 13/20 454/367 |
| 2015/0280520 A1 * | 10/2015 | Humer | ..................... | H02K 9/18 310/51 |
| 2016/0172926 A1 * | 6/2016 | Miller | ..................... | H02K 5/10 310/58 |

FOREIGN PATENT DOCUMENTS

| | | |
|---|---|---|
| CN | 101990731 A | 3/2011 |
| CN | 102325436 A | 1/2012 |
| CN | 202231982 U | 5/2012 |
| CN | 202931111 U | 5/2013 |
| DE | 195 15 252 A1 | 11/1996 |
| WO | 2009/121734 A2 | 10/2009 |

* cited by examiner

MOTOR DRIVE COVER FOR PROTECTION AGAINST CONTAMINANTS

CROSS-REFERENCE TO RELATED APPLICATIONS

This application is entitled to the benefit of and incorporates by reference subject matter disclosed in the International Patent Application No. PCT/IB2014/062153 filed on Jun. 12, 2014 and U.S. Provisional Patent Application No. 61/861,184 filed on Aug. 1, 2013.

TECHNICAL FIELD

The present invention relates to a cover for a motor drive. The cover may, for example, provide additional protection for the motor drive in order to enable the drive to be placed outside in potentially hostile conditions.

BACKGROUND

FIG. 1 shows a known motor drive (the terms variable speed drive or variable frequency drive are also used to refer to a motor drive—the terms are used interchangeably in this document), indicated generally by the reference numeral 1. Motor drives generate significant heat during use and therefore require cooling. The variable speed drive 1 shown in FIG. 1 includes a back channel 2 that provides the bulk of the cooling for the electrical circuitry within the drive 1. Nevertheless, this is not sufficient and an air inlet 3 and air outlet 4 are provided on the front of the drive to provide an additional air flow for cooling purposes.

In order for sufficient cooling to be provided, it is important that the air inlet 3 and air outlet 4 are not blocked. This is not generally a problem when the drive 1 is mounted indoors in a relatively clean environment. However, the air inlets and outlets provide a weakness in the structure of the cabinet that is particularly problematic if the drive 1 is mounted outdoors (where it may, for example, be required to withstand rain) or in a particularly harsh indoor environment.

It is possible to mount the drive 1 within an enclosure box in order to protect the drive from, for example, rain, sand or excessive dust. However, such an enclosure must allow sufficient air to flow into the air inlet 3 and away from the air outlet 4, otherwise the thermal performance of the drive 1 will be adversely affected.

A known solution to this problem is to provide a cabinet to protect the drive 1. A commonly used cabinet is the so-called NEMA 3R cabinet (as rated by the National Electrical Manufacturers Association). NEMA 3R cabinets typically involve mounting the drive within the cabinet. Fans are typically provided at the bottom of the cabinet to draw air in for cooling the drive. The air is typically expelled out of the side of the cabinet. In addition to cooling fans, heaters are often provided in order to be able to heat the cabinet to prevent condensation when the drive is not operational. Other possible features include filters and mounting feet to raise the cabinet off the ground.

Cabinets such as NEMA 3R cabinets are expensive. Moreover, such cabinets are necessarily larger than the drive that is being enclosed (substantially larger in the case of a typical NEMA 3R implementation). The additional expense and/or the additional space requirements are unacceptable in many circumstances.

The present invention seeks to address at least some of the problems outlined above.

SUMMARY

The present invention provides a cover (typically a partial cover) for a motor drive, wherein the drive includes an air inlet and an air outlet (for the passage of cooling air), the cover comprising: a first opening (often at the bottom of the cover), wherein, in use, air is allowed to pass through the first opening to the air inlet; a second opening, wherein, in use, air is allowed to pass from the air outlet through second opening; and a separator (such as a baffle) inside the cover that is dimensioned and positioned such that, in use, air is prevented from flowing inside the cover from the air outlet to the air inlet.

The present invention also provides a cover (typically a partial cover) for a motor drive, wherein the drive includes an air inlet and an air outlet (for the passage of cooling air), the cover comprising: a first opening (often at the bottom of the cover), wherein, in use, air is allowed to pass through the first opening to the air inlet; a second opening, wherein, in use, air is allowed to pass from the air outlet through second opening; and a rain restrictor that restricts the ingress of rain into the cover. The cover may additionally comprise a separator (such as a baffle) inside the cover that is dimensioned and positioned such that, in use, air is prevented from flowing inside the cover from the air outlet to the air inlet.

The present invention further provides a motor drive comprising an air inlet, an air outlet and a (partial) cover, the cover comprising: a first opening, wherein, in use, air is allowed to pass through the first opening to the air inlet; a second opening, wherein, in use, air is allowed to pass from the air outlet through second opening; and a separator (such as a baffle) inside the cover that is dimensioned and positioned such that, in use, air is prevented from flowing inside the cover from the air outlet to the air inlet.

The present invention yet further provides a motor drive comprising an air inlet, an air outlet and a (partial) cover, the cover comprising: a first opening, wherein, in use, air is allowed to pass through the first opening to the air inlet; a second opening, wherein, in use, air is allowed to pass from the air outlet through second opening; and a rain restrictor that restricts the ingress of rain into the cover. The cover may additionally comprise a separator (such as a baffle) inside the cover that is dimensioned and positioned such that, in use, air is prevented from flowing inside the cover from the air outlet to the air inlet.

Where provided, the rain restrictor "restricts" the ingress of rain into the cover, but does not necessarily prevent the rain from entering the cover completely. This is possible in many forms of the invention because the drive itself provides significant protection from water ingress. What is typically required of the rain restrictor is to prevent very large quantities of water from impacting on the drive in a short space of time, since the drive may not be capable of withstanding such a harsh environment.

The rain restrictor and/or the separator may be shaped to direct at least some air from the air outlet away from the cover (in order to reduce the re-circulation of air). Where both are provided, the rain restrictor and the separator may co-operate to direct air from the air outlet away from the cover.

In many forms of the invention, the cover only covers a portion of the drive (so that portions of the drive that are not already sufficiently well protected are protected by the cover). This reduces materials, and reduces size requirements, as well as allowing other parts of the drive to be cooled "as normal". By way of example, the rear of the drive may be uncovered.

The second opening may be provided on the front of the cover and, in use, extend parallel to the air outlet. The first and/or the second opening may be on a side of the front cover.

The separator/baffle may extend upwards from the second opening to the exterior of the drive. Thus, the separator may direct air from the air outlet towards the second opening. If the separator extends upwards from the bottom of the second opening to the air outlet, then air exiting the cover will tend to be directed away from the cover (thereby reducing re-circulation).

In an alternative form of the invention, the second opening is provided on the side of the cover (and may extend perpendicular to the air outlet).

In many forms of the invention, a rain restrictor is provided in the form of a hood provided on the exterior of the cover. The hood may be shaped to direct at least some air from the air outlet away from the cover. For example, a projection may be provided towards the bottom of the hood that extends, at an angle, away from the plane of the cover. Alternatively, the hood may be shaped by providing a notch towards the bottom of the hood.

In an alternative form of the invention, the rain restrictor is a louvered opening.

Where provided, the rain restrictor typically restricts the ingress of rain into the cover through the second opening. Thus, the rain restrictor addresses one of the problems associated with providing the second opening in the cover.

In many forms of the invention, the cover is provided as a kit that, in use, is placed over an existing drive. The kit includes connection means for attaching the cover to the motor drive.

BRIEF DESCRIPTION OF THE DRAWINGS

The invention will now be described in further detail with reference to the following schematic drawings, in which.

DETAILED DESCRIPTION

The inventors have realised that many of the problems with the prior art can be addressed by providing only a partial cover, wherein the partial cover covers the portions of the drive that are vulnerable, but leaves other portions uncovered. This may be true, for example, where the drives itself provides good protection from, for example, rain, sand or excessive dust.

In particular, the air inlet 3 and air outlet 4 need to be covered, but, in many embodiments, the back channel 2 (if provided) does not need to be covered, since the back channel is not vulnerable to rain ingress.

Providing a partial cover reduces cost (by reducing material requirements) and also reduces size. However, dealing with heat generation by the drive is not trivial as any covering of the drive reduces the scope for heat removal.

Figure 1:
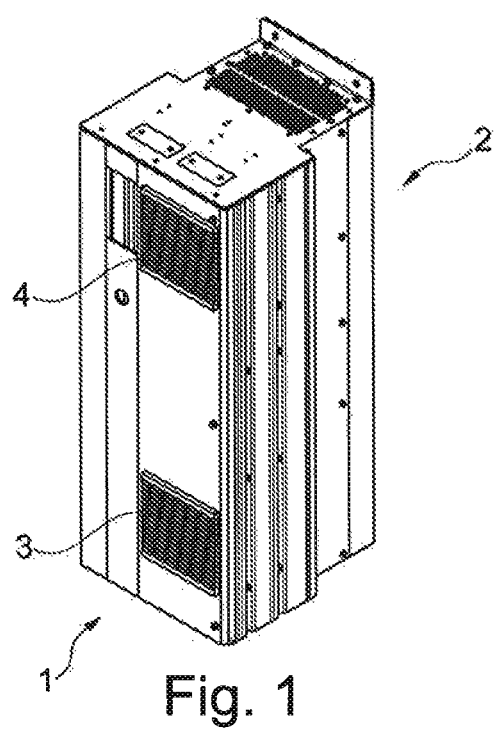
FIG. 1 shows a known variable speed drive.
Figure 2:
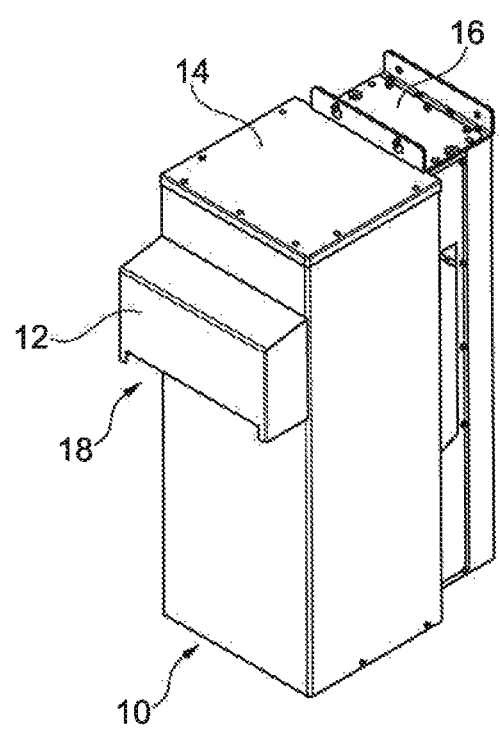
FIG. 2 shows the drive of FIG. 1 that is protected with a partial cover in accordance with an aspect of the present invention.

FIG. 2 shows the drive of FIG. 1 that is protected with a partial cover 10 in accordance with an aspect of the present invention. The cover 10 comprises a hood 12, a top 14 and a mounting arrangement 16. The mounting arrangement 16 is used to physically connect the cover 10 to the drive 1 (for example using screws, as shown in FIG. 2). The hood 12 includes a notch 18 that is described in detail below.

Figure 3:
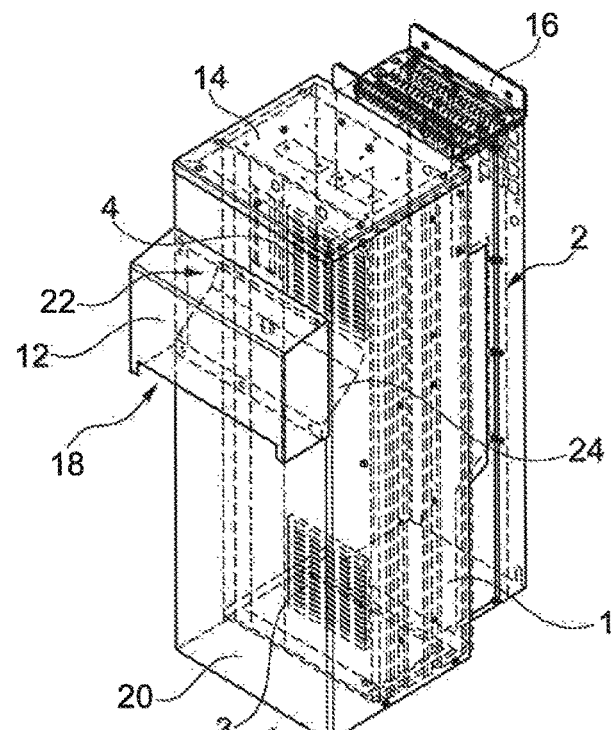
FIG. 3 is a partially cut-away view of the drive and cover of FIG. 2.

FIG. 3 shows a partially cut-away view of the drive 1 and cover 10 of FIG. 2. FIG. 3 shows the drive 1, including the back channel 2, air inlet 3 and air outlet 4. The cover 10 includes the hood 12 (including the notch 18), top 14 and mounting arrangement 16 as shown in FIG. 2. As shown in FIG. 3, the mounting arrangement 16 is screwed to the drive 1 so that the cover is held in place, with a gap between the front of the drive 1 and the front of the cover 10. The gap allows air to flow, as described further below.

The cover 10 includes an opening at the bottom, indicated generally by the reference numeral 20, an opening in the front of the cover, indicated generally by the reference numeral 22, and a baffle 24. The baffle is connected to the cover 10 (or forms part of the cover) and, in use, is in contact with the front of the drive 1. For reasons described in detail below, the baffle 24 prevents air from flowing between the openings 20 and 22 within the space between the cover 10 and the drivel.

Figure 4:
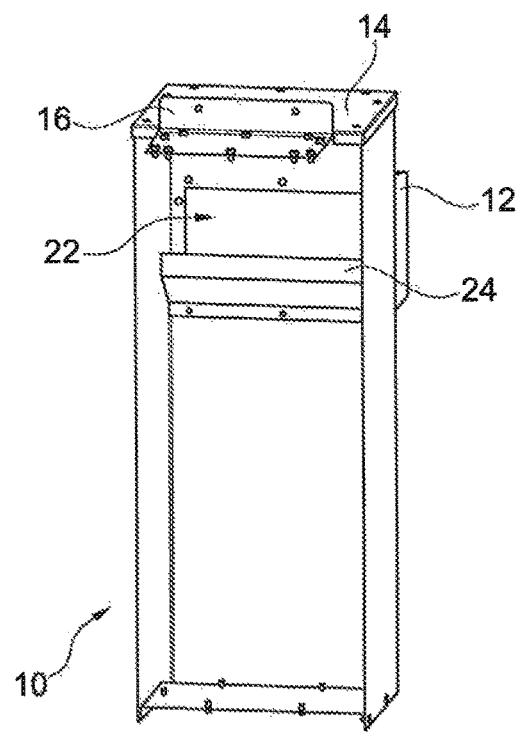
FIG. 4 is a rear view of a cover in accordance with an aspect of the present invention.

FIG. 4 is a rear view of the cover 10. In FIG. 4, the opening 22 and the baffle 24 are more clearly visible than in FIG. 3. The hood 12 (which is partially obscured), the top 14 and the mounting arrangement 16 are also shown in FIG. 4.

When the cover 10 is attached to the drive, cooling air is able to enter drive 1 via the opening 20 and the air inlet 3. A fan is typically provided to draw air in through the opening 20.

Air drawn in through the air inlet 3 is used to cool the drive 1 and is then expelled through the air outlet 4. Air expelled through the air outlet 4 is able to leave the vicinity of the drive 1 through the opening 22.

As described above, a disadvantage with the provision of the air inlet 3 and the air outlet 4 is that when used outdoors without a cover, rain can enter the inlets and outlets and potentially damage the drive. Providing a cover addresses this problem, but prevents air flow.

The provision of the opening 22 enables air flow. The provision of the hood 12 provides protection against rain ingress (and also at least some protection against other contaminants, such as sand). Together, the opening 22 and the hood 12 seek to address the twin problems of rain protection and heat dissipation.

A further problem with providing a cover for the drive 1 is that hot air expelled through the air outlet 4 tends to be directed, by the cover, towards the air inlet 3. This leads to the recirculation of air that has already been heated within the cooling arrangement of the drive. Clearly, this significantly reduces the effectiveness of the cooling arrangement.

The cover 10 partially addresses this problem using the baffle 24. The baffle prevents air from flowing from the air outlet 4 to the air inlet 3 in the region between the drive 1 and the cover 10. This arrangement significantly reduces the recirculation of air as all of the air entering the air inlet 3 must enter the cover via the opening 20.

Although the baffle 24 prevents the recirculation of air within the interior of the cover 10, air exiting the air outlet 4 can recirculate by passing through the opening 22 and then entering the cover via the opening 20. The provision of the hood 12 tends to direct hot air exiting the opening 22 downwards (i.e. towards the opening 20); accordingly, the hood 12 can add to the problem of recirculation of air outside the cover.

The cover 10 seeks to reduce this external recirculation problem by shaping the hood and/or the baffle to direct air away from the drive (rather the directly downwards). This reduces the tendency of hot air to be recirculated via the inlet.

As shown in FIGS. 3 and 4, the baffle is angled in order to direct the air away from the cover 1 rather than directly downwards.

As shown in FIG. 3, the rain hood 12 includes a rectangular cut-out portion or notch, indicated generally by the reference numeral 18. In forms of the invention in which the notch in the hood is not provided, air directed by the baffle 24 tends to hit the rain hood and then be redirected downwards. The provision of the notch allows at least some of the air passing through the opening 22 to be directed away from the cover 10. The size and shape of the notch shown in FIG. 3 is provided by way of example; many alternatives will be apparent to the person skilled in the art.

The problem of recirculation could be reduced further by increasing the height of the notch, or by simply reducing the size of the rain hood 12. However, the rain hood is also required to reduce the amount of rain (or other substances) from entering the interior of the cover through the opening 22 and so a balance is required between directing air away from the cover and preventing rain from entering through the opening 22. The optimum balance may vary from application to application.

Figure 5:
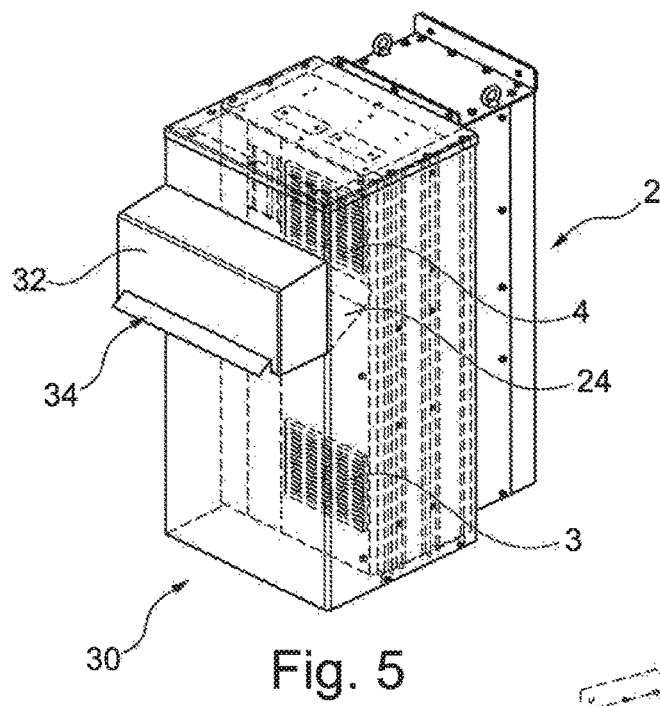
FIG. 5 shows a drive protected by a cover in accordance with an aspect of the present invention.

FIG. 5 shows a drive protected by an alternative cover, indicated generally by the reference numeral 30. The cover 30 includes a rain hood 32 (similar to the rain hood 12 described above). The air inlet 3, air outlet 4 and baffle 24 are also shown in FIG. 5.

The rain hood 32 differs from the rain hood 12 in that the notch 18 has been replaced with a bent portion 34. In effect, the area of the rain hood 12 that was removed to provide the notch 18 has, instead of being removed, been bent away from the hood 12. In a similar manner to the baffle 24, the bent portion tends to direct air away from the cover 12. Thus, the function of the bent portion 34 is similar to that of the notch 18 described above. As with the notch 18, the size and shape of the bent portion 34 may be varied.

It should be stressed that although the provision of a notch 18, a bent portion 34 or a similar arrangement for directing air away from the cover 1 may be advantageous in many implementations, this is not essential to all forms of the invention. The rain hood may, for example, be a simple cuboid shape having a rectangular opening at the bottom.

Figure 6:
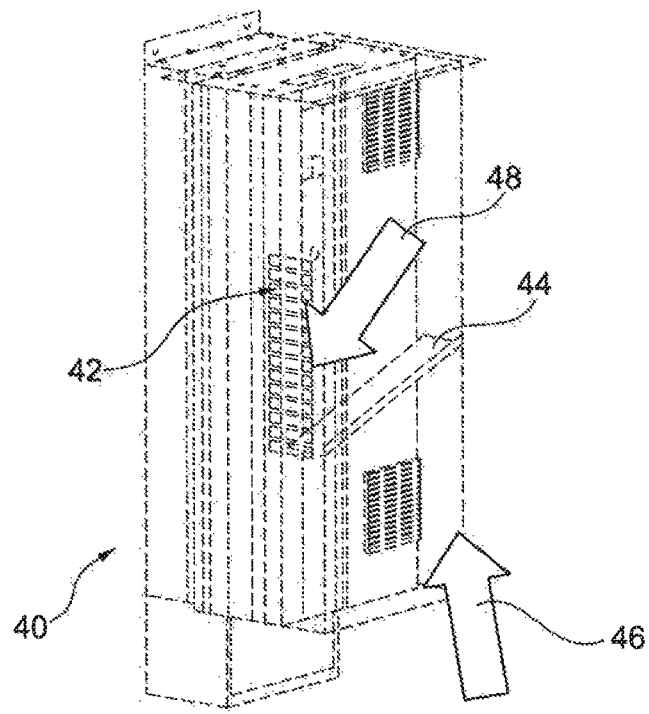
FIG. 6 shows a drive that is protected by a cover in accordance with another aspect of the present invention.

The rain hoods 12 and 32 described above are not the only mechanism that can be used to restrict rain from entering the interior of the cover. By way of example, FIG. 6 shows a drive that is protected by a cover 40 in accordance with another aspect of the present invention in which the rain hoods 12 and 32 are replaced with a louvered opening 42. The provision of the louvered opening is attractive as it keeps the cover protected from rain without requiring a portion of the cover extending outwards (and therefore increasing the area occupied by the cover). The cover 40 effectively provides a collection of small openings, rather than a single large opening. This is likely to reduce the ability of hot air to move away from the drive 1 and so the thermal performance of the cover 40 may not be as good as that of the covers 10 and 30 described above.

The cover 40 includes a baffle 44 that has a similar function to the baffle 24 described above. The baffle is angle downwards from right to left (when viewing the cover from the front) in order to direct hot air from the air outlet towards the louvered opening 42. As with the baffle 24, the baffle 44 prevents air circulation within the space between the drive and the cover 40.

As indicated by the arrow 46, air enters the cover (and hence the air inlet) through the opening in the bottom of the cover. As indicated by the arrow 48, air exits the cover through the louvered opening 42.

The position of the air inlet 3 and/or air outlet 4 as shown attached Figures is not essential to all forms of the invention. For example, at least one of the inlet and outlet could be provided on the side of the drive (rather than on the front). Furthermore, at least one of the inlet and outlet could be provided on the top and/or the bottom of the drive. In the arrangements described above, the air inlet 3 is provided towards the bottom of the drive 1 and the air outlet 4 is provided near the top of the drive; these positions could be reversed. Other possible variants will be apparent to the person skilled in the art.

As described above, the baffles 24 and 44 act as separators that prevent air from re-circulating within the cover from the outlet to the inlet of the drive. This is a particular problem with the configurations shown in Figures in which the air inlet 3 and the air outlet 4 are both provided on the front of the drive. Clearly, if the air inlet and air outlet are not both provided on the front of the drive, then the problem of air re-circulation may be significantly reduced. Indeed, the problem may be reduced to an extent to which the baffles are no longer required. Accordingly, the provision of baffles to prevent recirculation of air within the drive is not essential to all embodiments of the present invention.

As described above, a rain restrictor (such as the hoods 12 and 32 and the louvered opening 42) are provided to reduce the amount of rain that enters the interior of the cover, thereby reducing the likelihood of rain entering the air outlet 4. It should be noted, however, that the provision of a rain restrictor is not essential to all forms of the invention. The restriction of rain is often required in order to enable the drive/cover assembly to be sufficiently water-resistant. However, if the environment in which the drive is to be deployed is not severe, or if the drive itself is reasonably water-tight, then the additional protection provided by the rain restrictor may not be required. Moreover, if the thermal requirements of the system are met by providing only a small opening 22 in the front of the cover, then the exposure of the drive to rain may be sufficiently low, even if the rain restrictor is not provided. Further, if the air outlet 4 is provided away from the opening 22, then, once again, the exposure of the drive to rain may be sufficiently low, even if the rain restrictor is not provided.

The prior art drive 1 described above with reference to FIG. 1 includes backchannel cooling. It should be stressed that although the provision of backchannel cooling has many advantages for use with the principles of the present invention, it is not essential to all forms of the invention.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A cover for a motor drive, wherein the drive includes an air inlet and an air outlet, the cover comprising:
   a first opening, wherein, in use, air is allowed to pass through the first opening to the air inlet;
   a second opening, wherein, in use, air is allowed to pass from the air outlet through second opening; and
   a separator inside the cover that is dimensioned and positioned such that, in use, air is prevented from flowing inside the cover from the air outlet to the air inlet;
   wherein the cover and the motor drive define a first space and a second space, the first space being fluidly connected with the air inlet and the second space being fluidly connected with the air outlet; and
   wherein a first surface of the separator abuts the first space and a second surface of the separator abuts the second space,
   wherein, when in use, air flows from the first space to the motor drive and then to the second space.

2. The cover as claimed in claim 1, wherein the separator is shaped to direct at least some air from the air outlet away from the cover.

3. The cover as claimed in claim 2, wherein the second opening is provided on the front of the cover and, in use, extends parallel to the air outlet.

4. The cover as claimed in claim 2, further comprising a rain restrictor that restricts the ingress of rain into the cover.

5. The cover as claimed in claim 1, wherein the second opening is provided on the front of the cover and, in use, extends parallel to the air outlet.

6. The cover as claimed in claim 5, wherein the separator extends upwards from the second opening to the exterior of the drive.

7. The cover as claimed in claim 6, further comprising a rain restrictor that restricts the ingress of rain into the cover.

8. The cover as claimed in claim 5, further comprising a rain restrictor that restricts the ingress of rain into the cover.

9. The cover as claimed in claim 1, further comprising a rain restrictor that restricts the ingress of rain into the cover.

10. The cover as claimed in claim 9, wherein said rain restrictor is a hood provided on the exterior of the cover.

11. The cover as claimed in claim 10, wherein the hood is shaped to direct at least some air from the air outlet away from the cover.

12. The cover as claimed in claim 11, wherein the hood is shaped by providing a projection towards the bottom of the hood that extends, at an angle, away from the plane of the cover.

13. The cover as claimed in claim 11, wherein the hood is shaped by providing a notch towards the bottom of the hood.

14. The cover as claimed in claim 9, wherein said rain restrictor is a louvered opening.

15. The cover as claimed in claim 9, wherein said rain restrictor is provided to restrict the ingress of rain into the cover through the second opening.

16. The cover as claimed in claim 9, wherein the rain restrictor is shaped to direct at least some air from the air outlet away from the cover.

17. The cover as claimed in claim 1, wherein the cover only covers a portion of the drive.

18. The cover as claimed in claim 17, wherein the rear of the drive is uncovered.

19. A motor drive comprising an air inlet and an air outlet, the motor drive further comprising a cover as claimed in claim 1.

* * * * *